May 31, 1960 S. A. SCHERBATSKOY 2,939,012
NON-DESTRUCTIVE TESTING
Filed Sept. 28, 1955

INVENTOR.
Serge A. Scherbatskoy

2,939,012

NON-DESTRUCTIVE TESTING

Serge A. Scherbatskoy, 804 Wright Bldg., Tulsa, Okla.

Filed Sept. 28, 1955, Ser. No. 537,153

2 Claims. (Cl. 250—83.3)

This invention relates to methods and apparatus for determining the characteristics of unknown substances by irradiating said substances with beta rays or high energy electrons and measuring the ability of said substances to backscatter said radiations.

Arrangements used in the prior art comprised a source of beta radiation and an ionization chamber. The source was located adjacently to the chamber, but it was shielded in such a way that the radiation emitted by the source could not reach directly the chamber. When a layer of the material under investigation was placed in or passed through the measuring position, the ionization chamber was actuated by beta rays diffusely reflected from the material and the current output of the ionization chamber was used as a measure of the properties of the material under test.

The above arrangements were based on measurement of the total backscattered radiation and provided, therefore, relatively crude information regarding the general characteristics of material under investigation. By means of my present invention, I obviate many of the limitations of the prior methods by providing a system for measuring the energy spectrum of the backscattered radiation. My improved system makes it possible to determine more exactly the detailed structure of the substances under investigation by correlating various components in the energy spectrum of the backscattered radiation with the properties of said substances.

It is an object of my invention to provide a method and an apparatus for determining the characteristics of unknown substances by measuring the spectral properties of backscattered beta radiations or high energy electrons.

Further objects of my invention will be apparent from the following description taken in connection with the accompanying drawing in which.

Figure 1:
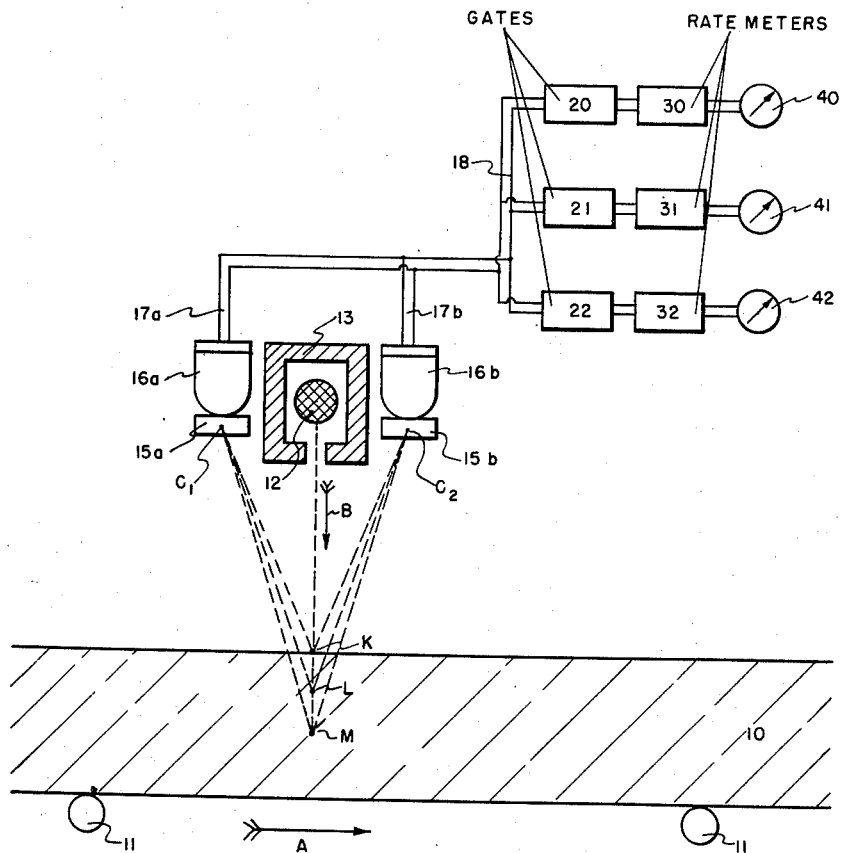
Fig. 1 shows a general arrangement for practicing my invention.

Referring now to Fig. 1, numeral 10 designates the material under study which may be an elongated sheet adapted to slide on rollers 11 in the direction of the arrow A. The testing and indicating instrument positioned above the sheet or slab 10 comprises a source 12 of beta rays or high energy electrons surrounded by a shield 13 which absorbs all radiations except those projected in the downward direction indicated by the arrow B. The source 12 may be a betatron adapted to emit a collimated beam of high energy electrons towards the slab 10 or it may be any material or artificially radioactive substance that emits beta radiations. In the following description, the terms "electrons" and "beta rays" will be used interchangeably since, essentially they designate same particles.

The electrons emitted by the source 12 in the downward direction are deflected and scattered by the slab 10 in all directions. A portion of the electrons scattered and deflected upwards interacts with the sodium iodide crystals 15a and 15b positioned on both sides of the source 12 adjacently to the shield 13. Each of the crystals 15a, 15b is sufficiently large in size so as to absorb completely the incoming electrons. Therefore, upon the absorption of an incident electron by the crystal 15a or 15b, a flash of light is emitted by the crystal, the intensity of said light being proportional to the energy of the absorbed electron. The scintillating crystals 15a, 15b cooperate with the photomultipliers 16a, 16b, respectively, in a manner well known in the art. Consequently, a flash of light emitted by the crystal 15a (or 15b) initiates an electrical impulse across the output terminals 17a of the photomultiplier 16a (or across the output terminals 17b of the photomultiplier 16b) the magnitude of said impulse being proportional to said light flash.

The terminals 17a and 17b are connected to the leads 18, and we obtain thus across the leads 18 a succession of impulses having magnitudes representing the energies of electrons that were deflected and scattered in the upward direction by the slab 10. These impulses are in turn transmitted to the gates 20, 21, and 22, each of said gates being adapted to transmit impulses within a narrow range of magnitudes, said range being characteristic of each gate. The outputs of gates 20, 21, 22 are respectively connected to the input terminals of rate meters 30, 31, 32, each of said ratemeters producing across its output terminals a D.C. voltage having magnitude representing the frequency of occurrence of impulses applied to its input terminals. The outputs of the ratemeters 30, 31, 32 are indicated on the meters 40, 41, 42, respectively.

Assume now the source 12 emits a monochromatic beam of electrons directed downwards as shown by the arrow B. The source 12 may be for instance a betatron and the energy of electrons emitted by the source may be of the order of 10 m.e.v. Let the energy of these primary electrons be designated as $E_1$. As shown in the figure, some of these electrons travel downward until they reach the surface of the sheet 10 and undergo a deflection at the surface at the point K and some of the deflected electrons are directed along the lines $KC_1$ and $KC_2$ towards the crystals 15a and 15b, respectively. It is noted that both the incident electrons directed downwards from the source 12 to the point K and the deflected electrons directed upward from the point K to the points $C_1$ and $C_2$ travel in air and suffer substantially no degradation of energy. Furthermore, the deflection of the incident electron at the point K is due to the collision of the electron with an atom of the substance 10 at the point K. Such a collision is usually elastic, i.e. the energy of the incident electron traveling downwards is the same as the energy of the deflected electron traveling upwards. Consequently, the electrons that are deflected at the point K arrive at the crystals 15a, 15b at their original energy $E_1$. These electrons are completely absorbed by the crystals 15a, 15b and we obtain, therefore, across the output terminals of the photomultipliers 16a, 17b electrical pulses having uniform magnitudes representing the energy $E_1$.

It is noted, however, that not all the electrons emitted by the source 12 undergo elastic collisions at the point K and are deflected upwards. Many of the electrons are not deflected at all and penetrate downwards into the substance 10—these electrons may travel a certain distance within the substance 10 and undergo a deflection at points such as L or M shown in Fig. 1.

For our purposes, it is important to ascertain what is the probability of an elastic collision at the point K, i.e. what is the ratio of the number of electrons that are deflected upwards at the point K to the number of electrons that penetrate substantially undeflected into the substance at the point K. It is well known from the theory of elastic collisions that this ratio is proportional to the atomic number Z of the deflecting atom, i.e. the higher is the atomic number, the larger is the number of electrons that arrive at the crystals along the trajectories $KC_1$ and $KC_2$. Each of these electrons has the energy $E_1$ and as explained hereafter, these are the only electrons having the energy $E_1$, since all other electrons incident upon the crystals $15a$, $15b$ have energies smaller than $E_1$. Let the number of these electrons be $N(E_1)$. Consequently, the value $N(E_1)$ is proportional to the atomic number Z of the atoms at the surface of the substance 10.

Consider now the undeflected electrons that penetrated into the substance 10 and continue to travel downwards in the direction of the arrow B. These electrons travel through a medium comprising heavy nuclei substantially uniformly distributed, each of said nuclei being surrounded by a cloud of orbital electrons. During their travel, these electrons undergo numerous inelastic collisions with the orbital electrons in the surrounding medium and gradually lose their energy. Occasionally at relatively rare occurrences, an incident electron, after having traveled in the medium, collides elastically with the atoms in the medium. These collisions are elastic and therefore the deflected electron has the same kinetic energy as the incident electron.

During each inelastic collision with an orbital electron, the incident electron loses a very small portion of its kinetic energy. These collisions are very frequent (while the elastic collisions are very rare) and consequently we can assume that as a result of inelastic collisions the incident electron loses its energy continuously and its trajectory remains undeflected.

It is thus apparent that a high energy electron passing through matter undergoes two types of interactions:

(a) Inelastic collisions with the surrounding electrons, the number of said collisions per unit of path being extremely large;

(b) Elastic collisions with atoms, said collisions occurring relatively infrequently.

The effects of inelastic collisions can be compared to effects in a viscous medium. As the particle plows through the medium it loses its kinetic energy gradually and continuously and the amount of energy lost by the particle becomes larger as its trajectory increases. However, as the particle travels along a substantially rectilinear path, it occasionally rebounds as a result of collisions with one of the atoms encountered in its path. We have then an elastic collision as a result of which the particle undergoes scattering, i.e. it deviates considerably from its original course.

We shall refer again to Fig. 1 and consider an electron with an initial energy $E_1$ which penetrated into the slab 10 at the point K, moved downward along the trajectory KL undergoing numerous inelastic collisions, as a result of which its energy degraded to a value $E_2 < E_1$ such that the amount of energy lost $E_1 - E_2$ is proportional to the density of electrons in the medium and to the length of the path KL. Assume further that the electron underwent an elastic collision with an atom at the point L and that the deflected electron arrived along the path $LC_1$ (or $LC_2$) to the crystal $15a$ (or $15b$). The crystal absorbs completely the deflected electron having energy $E_2$ and we obtain across the output terminals of the photomultiplier $16a$ (or $16b$) a pulse having a magnitude proportional to $E_2$. As stated above, the probability that the incident electron arriving at the point L undergoes a deflection at said point is proportional to the atomic number of the deflecting atom at the point L.

It is thus apparent that among the scattered electrons interacting with the crystals $15a$ and $15b$ those electrons that have energies $E_2$ originate at the point L since the energy loss $E_1 - E_2$ corresponds to the length of the particle track equal to KL. Furthermore, the number of electrons having energy $E_2$ detected by the crystals $15a$, $15b$ is proportional to the atomic number of the deflecting atoms at the point L. We shall designate this number of electrons as $N(E_2)$.

In a similar manner, we can consider those electrons that penetrated into the slab 10 until they reached the point M at which they are deflected in the directions $MC_1$ and $MC_2$. The energy of these deflected electrons, $E_3$, is such that $E_3 < E_1$ and $E_1 - E_3$ is a measure of the distance KM. Furthermore, the number $N(E_3)$ of these deflected electrons represents the scattering ability, i.e. the atomic number of the atoms at the point L.

It is thus apparent that we obtain across the output leads 18 of the photomultipliers $16a$ and $16b$ a succession of impulses corresponding to the energies $E_1$, $E_2$, and $E_3$.

These impulses are applied to the gates 20, 21, and 22. The gate 20 is adapted to transmit only those impulses that are comprised within a relatively narrow energy range comprising the value $E_1$. These impulses are applied to the ratemeter 30 and thus we obtain on the indicator 40 connected to the ratemeter 30 the value $N(E_1)$ representing the atomic number of the atoms at the point K since the deflected electrons having energy $E_1$ originate at the point K. As the slab 10 moves on the rollers 11 in the direction A, the indication of the meter 30 may vary. However, this indication always represents the atomic number of the atoms covering the surface layer of the slab 10.

The gates 21 and 22 are adapted to transmit only those impulses that are comprised within relatively narrow energy ranges comprising the values $E_2$ and $E_3$, respectively. These impulses are applied to the ratemeters 31 and 32, respectively, and consequently, we obtain on the indicators 41 and 42 the values $N(E_2)$ and $N(E_3)$, respectively. Thus as the slab 10 moves in the direction of the arrow, the indication of the meter 41 shows the atomic number of the elements located at the distance KL from the surface of the slab and the indication of the meter 42 shows the atomic number of the elements located at this distance KM from the surface of the slab.

My invention is particularly applicable to slab having a non-uniform structure and by means of the indicators 40, 41, 42 I provided a system for determining the structure at various depths in the slab.

In describing my invention, I assumed that the deflection of the electrons that penetrated into the slab 10 occurred at two discrete depths, namely KL and KM. Actually, the deflection takes place at all the depths continuously distributed within the slab and the electrons deflected at each particular depth have an energy representing the magnitude of said depth. Therefore, in some instances it may be desirable to provide a larger number of gates corresponding to energies more closely spaced one from the other, so as to provide a more detailed representation of the energy spectrum of the scattered electrons.

Figure 2:
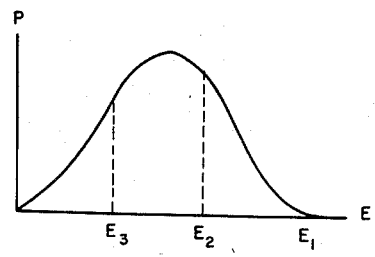
Fig. 2 shows the energy distribution of beta ray emitters that are used in one of the embodiments of my invention.

Consider now another embodiment of my invention in which we use as the source 12 of Fig. 1, any of the commonly commercially available beta ray emitters, such as, for instance, $P^{32}$ or $Sr^{89}$. Beta rays emerging from a radioactive source are not monoenergetic (as in the case of the previously referred to betatron). They possess a continuous spectrum of energies as shown in Fig. 2. In Fig. 2 the abscissas represent the energies of emitted beta rays and the ordinates represent the corresponding number of beta rays. The value $E_1$ designate the most energetic beta rays that characterize a given isotope. Thus for $P^{32}$, $E_1 = 1.7$ Mev. and for $Sr^{89}$, $E_1 = 1.5$ Mev. It is apparent therefore that the beam emitted by the source 12 downwards in the direction of the arrow B does not have a homogeneous energy distribution. We shall consider separately various components of this beam that we shall designate as (a), (b), and (c). The component (a) shall contain only those incident electrons that have energies substantially equal to $E_1$. The component (b) shall contain those incident electrons that have energies between $E_1$ and $E_2$ and the component (c) shall contain those incident electrons that have energies between $E_2$ and $E_3$. The values $E_1$, $E_2$, and $E_3$ are shown on Fig. 2.

The gates 20, 21, 22 are designed somewhat differently than in the previous embodiment and namely the gate 20 is adapted to transmit those current impulses that represent energies substantially equal to $E_1$; the gate 21 is adapted to transmit those current impulses representing energies between $E_1$ and $E_2$ and the gate 22 is adapted to transmit the current impulses corresponding to the energies between $E_2$ and $E_3$.

Consider now the beam of electrons deflected by the slab 10 towards the crystals 15a and 15b, and particularly the three components of this beam designated as (a), (b), (c).

The electrons comprised within the component (a) of the deflected beam are all deflected at the point K on the surface of the slab 10. These electrons do not suffer any degradation in energy and consequently they appear in the deflected beam at the same energy $E_1$. They produce across the output leads 18 pulses that are selectively transmitted through the gate 20. Consequently, we obtain an indication on the meter 40, representing the number of electrons that underwent scattering on the surface of the slab 10. As explained above, this number indicates the atomic number of the elements covering the surface of the slab 10.

Consider now the electrons of the group (b) that appear in the deflected beam and interact with the crystals 15a, 15b. As stated above, these electrons have energies distributed within the band from $E_1$ to $E_2$. It is apparent that these electrons are originated by the primary beam of the same energy group (b). This primary beam directed downwards in the direction of the arrow B enters the slab and is deflected by the atoms distributed at various depths from the point K to the point L. It is thus apparent that the number of electrons deflected by the slab and comprised within the energy group (b) is an index of the atomic number of the elements comprised within the depth range from zero to KL. The deflected electrons belonging to the group (b) produce impulses that are transmitted through the gate 21 and thus the rate of occurrence of these impulses indicated on the meter 41 represents the properties of the slab 10 within the depth range KL.

The electrons in the group (c) that appear in the deflected electron beam are originated by the primary electrons that penetrated into the slab 10 and have been deflected by the atoms distributed at various depths from the point K to the point M. These electrons produce impulses that are transmitted through the gate 22 and thus the rate of occurrence of these impulses indicated on the meter 42 represents the atomic number of the elements in the slab comprised within the depth range extending from zero to KM.

It is thus apparent that the meters 40, 41, 42 indicate the variations in the physical properties of the slab, as the slab moves in the direction of the arrow A.

I claim:

1. Apparatus for non-destructive testing and analysis of matter comprising, in combination, a source of high-energy beamed electrons of known energy distribution, said source being disposed to direct said beam into said matter, a detector for electrons positioned to intercept and detect back-scattered electrons originating at said source and leaving said matter after being scattered therein, said detector producing responsively to detected electrons electric impulses of magnitudes respectively representative of the energies thereof, means fed by said impulses for separating the same into a plurality of ranges of magnitude according to energy ranges of detected electrons represented thereby, and means for separately measuring the occurrence rates of the impulses in each such magnitude range, to indicate the nature of said matter at various zones therein.

2. The apparatus defined in claim 1 wherein said electron sources produces a substantially monochromatic electron beam.

References Cited in the file of this patent

UNITED STATES PATENTS

| | | |
|---|---|---|
| 2,304,910 | Hare | Dec. 15, 1942 |
| 2,390,433 | Fearon | Dec. 4, 1945 |
| 2,469,460 | Fearon | May 10, 1949 |
| 2,712,609 | Herzog et al. | July 5, 1955 |
| 2,750,512 | Meloy | June 12, 1956 |
| 2,755,389 | Jones et al. | July 17, 1956 |